United States Patent
Tanaka et al.

(10) Patent No.: US 9,266,742 B2
(45) Date of Patent: Feb. 23, 2016

(54) METHOD FOR PRODUCING TRICHLOROSILANE

(75) Inventors: Shuji Tanaka, Niigata (JP); Masaki Tabata, Niigata (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 711 days.

(21) Appl. No.: 13/583,794

(22) PCT Filed: Mar. 1, 2011

(86) PCT No.: PCT/JP2011/001189
§ 371 (c)(1),
(2), (4) Date: Sep. 10, 2012

(87) PCT Pub. No.: WO2011/111335
PCT Pub. Date: Sep. 15, 2011

(65) Prior Publication Data
US 2013/0001063 A1    Jan. 3, 2013

(30) Foreign Application Priority Data
Mar. 10, 2010   (JP) .................................. 2010-052548

(51) Int. Cl.
*B01D 3/14*    (2006.01)
*C01B 33/107*  (2006.01)
*B01D 3/00*    (2006.01)

(52) U.S. Cl.
CPC ............ *C01B 33/1071* (2013.01); *B01D 3/009* (2013.01); *B01D 3/143* (2013.01); *C01B 33/10757* (2013.01); *C01B 33/10763* (2013.01); *C01B 33/10778* (2013.01)

(58) Field of Classification Search
CPC .......... B01D 3/009; B01D 3/14; B01D 3/143; C01B 33/1071; C01B 33/10757; C01B 33/10763; C01B 33/10778
See application file for complete search history.

(56) References Cited

U.S. PATENT DOCUMENTS 4,526,769 A     7/1985   Ingle et al.
4,548,917 A * 10/1985   Lepage et al. ................ 502/150
(Continued)

FOREIGN PATENT DOCUMENTS

CN    1807238 A    7/2006
EP    0 146 148 A1    6/1985
(Continued)

OTHER PUBLICATIONS

International Search Report Issued May 10, 2011 in PCT/JP11/001189 Filed Mar. 1, 2011.
(Continued)

*Primary Examiner* — Renee E Robinson
*Assistant Examiner* — Jonathan Miller
(74) *Attorney, Agent, or Firm* — Oblon, McClelland, Maier & Neustadt, L.L.P.

(57) ABSTRACT

A mixture containing methyldichlorosilane, tetrachlorosilane, and trichlorosilane is distilled to fractionate a fraction with a higher content of methyldichlorosilane than the mixture before distillation. Subsequently, the fraction thus fractionated is heated to disproportionate chlorine between methyldichlorosilane and tetrachlorosilane to disproportionate methyldichlorosilane into methyltrichlorosilane. Subsequently, the fraction after disproportionation containing methyltrichlorosilane is purified by distillation to separate high-purity trichlorosilane. Having a close boiling point to that of trichlorosilane (32° C.), which is a target product to be purified by distillation, removal of methyldichlorosilane (boiling point of 41° C.) has been difficult. The present invention removes methyldichlorosilane more easily by converting it into methyltrichlorosilane (boiling point of 66° C.) through disproportionation of chlorine between methyldichlorosilane and tetrachlorosilane.

17 Claims, 3 Drawing Sheets

(56) References Cited

U.S. PATENT DOCUMENTS

| | | | | |
|---|---|---|---|---|
| 4,605,543 A * | 8/1986 | Lepage et al. | ................ | 423/347 |
| 4,746,752 A * | 5/1988 | Lepage et al. | ................ | 556/469 |
| 4,986,971 A | 1/1991 | Forwald et al. | | |
| 5,252,768 A * | 10/1993 | Geisberger et al. | ........... | 556/469 |
| 5,321,147 A | 6/1994 | Chadwick et al. | | |
| 5,434,286 A * | 7/1995 | Geisberger | ................... | 556/469 |
| 8,038,961 B2 * | 10/2011 | Sonnenschein et al. | ...... | 422/211 |
| 2009/0060817 A1 | 3/2009 | Shimizu et al. | | |
| 2009/0060820 A1 | 3/2009 | Shimizu et al. | | |
| 2009/0060822 A1 | 3/2009 | Shimizu et al. | | |

FOREIGN PATENT DOCUMENTS

| | | | |
|---|---|---|---|
| EP | 2 033 937 A2 | 3/2009 | |
| EP | 2 036 857 A2 | 3/2009 | |
| EP | 2 036 859 A2 | 3/2009 | |
| JP | 56 73617 | 6/1981 | |
| JP | 60 36318 | 2/1985 | |
| JP | 2 208217 | 8/1990 | |
| JP | 7 89709 | 4/1995 | |
| JP | 9 169514 | 6/1997 | |
| JP | 10 29813 | 2/1998 | |
| JP | 2004 149351 | 5/2004 | |
| JP | 2004 250317 | 9/2004 | |
| JP | 2007 269679 | 10/2007 | |
| JP | 2009 62209 | 3/2009 | |
| JP | 2009 62210 | 3/2009 | |
| JP | 2009 62212 | 3/2009 | |

OTHER PUBLICATIONS

Combined Chinese Office Action and Search Report issued Dec. 5, 2013 in Patent Application No. 201180013151.5 with English Translation of Category of Cited Documents.

Extended European Search Report issued Apr. 8, 2015 in Patent Application No. 11753001.4.

* cited by examiner

METHOD FOR PRODUCING TRICHLOROSILANE

CROSS REFERENCE TO RELATED APPLICATION

This application is a 371 of PCT/JP2011/001189, filed on Mar. 1, 2011, and claims priority to Japanese Patent Application No. 2010-052548, filed on Mar. 10, 2010.

TECHNICAL FIELD

The present invention relates to a method for producing trichlorosilane. In more detail, the present invention relates to a method for separating trichlorosilane from methyldichlorosilane more easily to obtain high-purity trichlorosilane.

BACKGROUND ART

Trichlorosilane ($HSiCl_3$) has long been used as a raw material for high-purity polycrystalline silicon, which is used for the production of silicon wafers, and the like. As to the technique for obtaining trichlorosilane, many synthetic methods are known, and Japanese Patent Laid-Open No. 56-73617 (Patent Literature 1) discloses an invention relating to a method for producing trichlorosilane, advantageously characterized in that the by-product silicon tetrachloride is efficiently converted into trichlorosilane in the production of trichlorosilane.

Other known methods for producing trichlorosilane include a direct method in which metallurgical grade silicon is allowed to contact hydrogen chloride at a temperature of about 250° C. or higher (refer to Japanese Patent Laid-Open No. 2-208217 (Patent Literature 2) and Japanese Patent Laid-Open No. 9-169514 (Patent Literature 3), and the like), a method for reducing silicon tetrachloride to trichlorosilane by reacting it with hydrogen in the presence of metallurgical grade silicon (refer to Japanese Patent Laid-Open No. 60-36318 (Patent Literature 4)), a method in which, using copper silicide in place of the metallurgical grade silicon, silicon tetrachloride is reduced to trichlorosilane by reacting it with hydrogen in the presence of the copper silicide (refer to Japanese Patent Laid-Open No. 10-29813 (Patent Literature 5)), and the like.

Meanwhile, an impurity such as phosphorus or boron acts as a donor or acceptor in a silicon crystal. Thus, when these dopant components are present in the raw material polycrystalline silicon used for the production of semiconductor, they will be taken up in the final silicon wafer product. For this reason, for the production of semiconductor grade polycrystalline silicon, high-purity trichlorosilane obtained through precise distillation is used.

In connection with the these manufacturing technologies for high-purity trichlorosilane, a method for separating and removing the aforementioned dopant components in advance before distillation of trichlorosilane by converting them into an easily separable form with a getter and the like is also proposed (for example, refer to Japanese Patent Laid-Open No. 2004-250317 (Patent Literature 6)).

Further, carbon impurities in silicon crystals form an impurity level within the band gap and act as a carrier trap, accelerate the formation of precipitation nuclei of oxygen in the crystals to induce defects in the production process of semiconductor devices, and the like. In view of the above, carbon impurity content is also a problem in semiconductor grade polycrystalline silicon.

Carbon impurities contaminating polycrystalline silicon may include carbon-containing compounds derived from a carbon member used in a CVD reactor which is employed for deposition of polycrystalline silicon, carbon-containing compounds contained in trichlorosilane or hydrogen, and the like. However, it is not easy to produce trichlorosilane from which carbon-containing compounds have been sufficiently removed.

This is due to the following reasons: Because metal silicone used for direct synthesis of trichlorosilane is produced in an arc furnace using a carbon electrode, it has a purity of only about 99% and includes carbon as an impurity. Also, because the product for trichlorosilane synthesis flowing out of a CVD reactor contains methylchlorosilanes derived from the carbon member inside the CVD reactor, trichlorosilane purified by distillation still contains a trace amount of the aforementioned carbon-derived methylchlorosilanes. For example, when a carbon impurity-containing product produced in an arc furnace using a carbon electrode is used as the metallurgical grade silicon, lower boiling methylchlorosilanes will be mixed in an amount of about several tens of ppm in terms of weight ratio as the carbon impurity-derived by-product.

Particularly, removal of methyldichlorosilane is difficult because it is not only the main component of methylchlorosilanes that are mixed in as described above but also its boiling point (41° C.) is close to that of trichlorosilane (32° C.), which is a target product to be purified by distillation.

CITATION LIST

Patent Literature

Patent Literature 1: Japanese Patent Laid-Open No. 56-73617
Patent Literature 2: Japanese Patent Laid-Open No. 2-208217
Patent Literature 3: Japanese Patent Laid-Open No. 9-169514
Patent Literature 4: Japanese Patent Laid-Open No. 60-36318
Patent Literature 5: Japanese Patent Laid-Open No. 10-29813
Patent Literature 6: Japanese Patent Laid-Open No. 2004-250317
Patent Literature 7: Japanese Patent Laid-Open No. 2004-149351

SUMMARY OF INVENTION

Technical Problem

In view of these problems, Japanese Patent Laid-Open No. 2004-149351 (Patent Literature 7) discloses a method for purifying trichlorosilane capable of reducing the concentration of carbon impurities at a relatively low cost. This method employs a technique in which trichlorosilane is allowed to contact adsorbents such as silica gel and activated carbon so that carbon-containing silicon chloride compounds in the trichlorosilane are uniformly removed all at once, irrespective of the boiling points.

However, removal of methyldichlorosilane whose boiling point is close to that of trichlorosilane is still difficult even with this method, and thus the burden on distillation is still unavoidably high. Aside from that, a burdensome task will arise such that adsorbents after the adsorption treatment need to be processed accordingly as waste products.

The present invention was completed in view of the foregoing problems, and an object of the present invention is to provide a technique that removes methyldichlorosilane more easily, which has been difficult to remove by conventional techniques, in the production of high-purity trichlorosilane without requiring a process of excessive distillation purification.

Solution to Problem

In order to solve such problems, the method for producing trichlorosilane of the present invention is a method for obtaining high-purity trichlorosilane from a mixture comprising methyldichlorosilane ($CH_3HSiCl_2$), tetrachlorosilane ($SiCl_4$), and trichlorosilane ($HSiCl_3$), comprising the steps of: (A) distilling the mixture to fractionate a fraction with a higher content of methyldichlorosilane than the mixture before distillation; (B) heating the fraction thus fractionated to disproportionate chlorine between methyldichlorosilane and tetrachlorosilane and thus convert the methyldichlorosilane into methyltrichlorosilane ($CH_3SiCl_3$); and (C) purifying the fraction after the disproportionation containing the methyltrichlorosilane ($CH_3SiCl_3$) by distillation to separate trichlorosilane.

The disproportionation of chlorine in the step (B) is preferably carried out at a temperature range of 300 to 600° C.

In the present invention, the disproportionation of chlorine in the step (B) can also be carried out without a catalyst.

In the present invention, the disproportionation of chlorine in the step (B) may be carried out in a heated vessel with a fluidized bed of silicon containing copper chloride as a catalyst under a hydrogen-containing.

Examples of the mixture comprising methyldichlorosilane, tetrachlorosilane, and trichlorosilane include the product of trichlorosilane synthesis by a reaction of metallurgical grade silicon with hydrogen chloride, the product of the reduction reaction of tetrachlorosilane into trichlorosilane under the hydrogen-containing, and the reaction product (off-gas) discharged by the production process of polycrystalline silicon using trichlorosilane as a raw material.

Advantageous Effects of Invention

The method for producing trichlorosilane of the present invention makes easier removal of methyldichlorosilane (boiling point of 41° C.), which has been difficult due to its close boiling point to that of trichlorosilane (32° C.), a target product to be purified by distillation, by converting it into methyltrichlorosilane (boiling point of 66° C.) through disproportionation of chlorine between methyldichlorosilane and tetrachlorosilane. According to the method for producing trichlorosilane as described above, methyldichlorosilane in trichlorosilane, which is hard to separate by distillation, is converted into a compound with a higher boiling point, thereby enabling reducing the overload on purification of high-purity trichlorosilane by distillation.

DESCRIPTION OF EMBODIMENTS

Hereinbelow, the embodiments of the present invention will be described in detail with reference to the Drawings.

Figure 1:
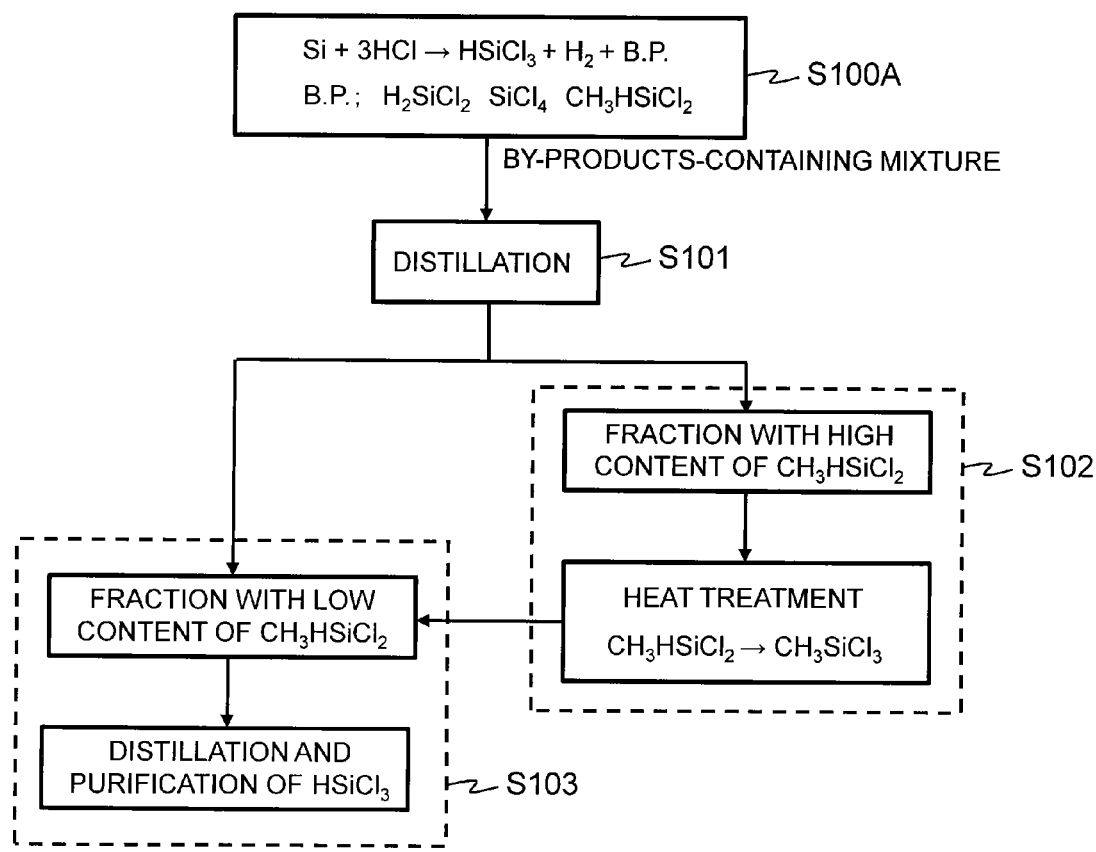
FIG. 1 is an exemplary flow chart for illustration of the method for producing trichlorosilane of the present invention.
Figure 2:
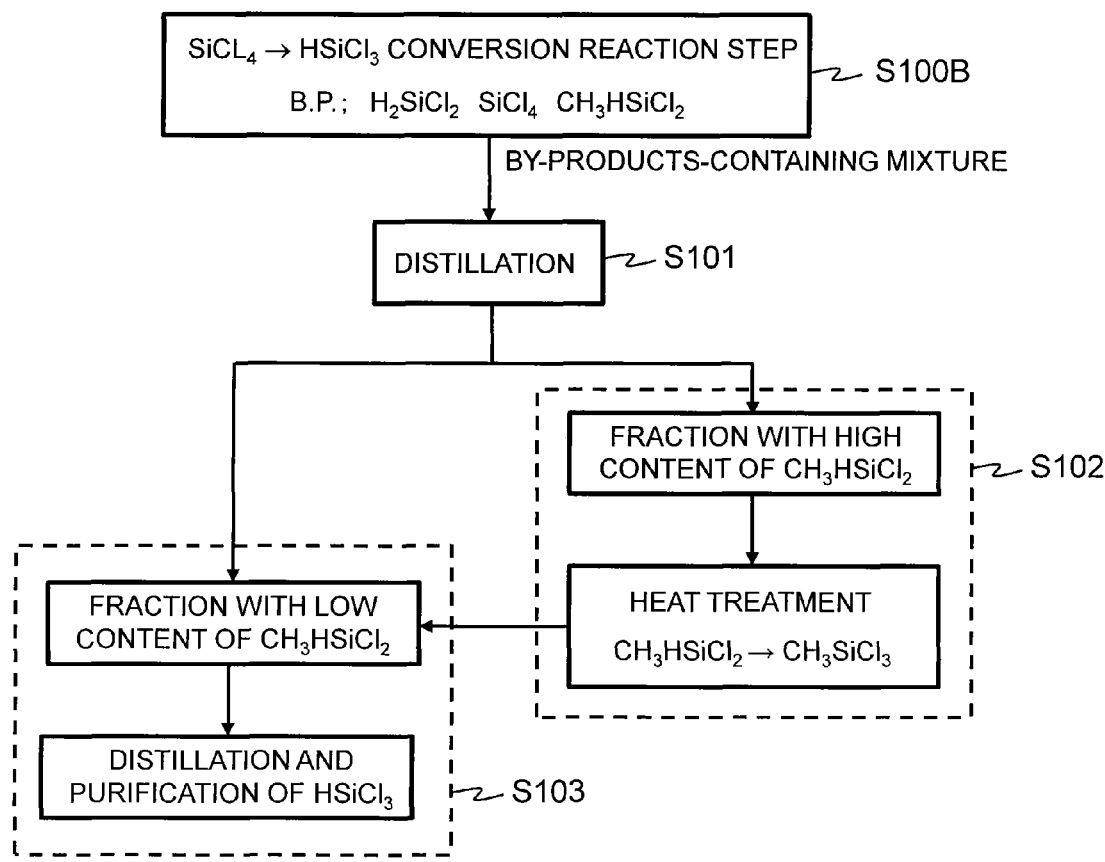
FIG. 2 is another exemplary flow chart for illustration of the method for producing trichlorosilane of the present invention.
Figure 3:
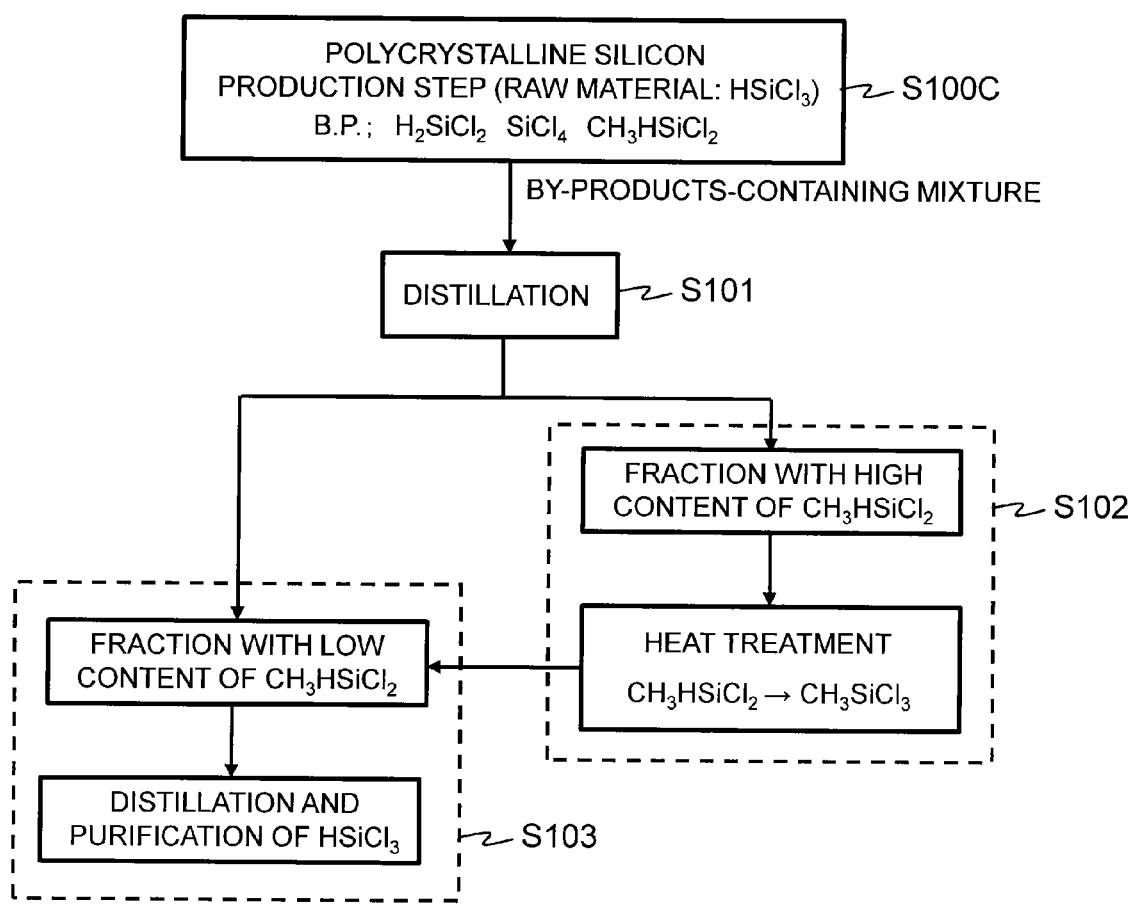
FIG. 3 is another exemplary flow chart for illustration of the method for producing trichlorosilane of the present invention.

FIGS. 1 to 3 are exemplary flow charts of the method for producing trichlorosilane of the present invention. In this method for producing trichlorosilane, a mixture containing methyldichlorosilane ($CH_3HSiCl_2$), tetrachlorosilane ($SiCl_4$), and trichlorosilane ($HSiCl_3$) is distilled to fractionate a fraction with a higher content of methyldichlorosilane than the mixture before distillation (S101), and then the fraction thus fractionated is heated to disproportionate chlorine between methyldichlorosilane and tetrachlorosilane to convert methyldichlorosilane into methyltrichlorosilane ($CH_3SiCl_3$) (S102).

Subsequently, the fraction containing methyltrichlorosilane ($CH_3SiCl_3$) after disproportionation is purified by distillation to separate high-purity trichlorosilane (S103).

As described above, removal of methyldichlorosilane (boiling point of 41° C.), which has been difficult due to its close boiling point to that of trichlorosilane (32° C.), a target product to be purified by distillation, is made easier by converting it into methyltrichlorosilane (boiling point of 66° C.) through disproportionation of chlorine between methyldichlorosilane and tetrachlorosilane. Furthermore, in order to efficiently carry out the conversion of methyldichlorosilane into methyltrichlorosilane (boiling point of 66° C.), the step of distilling a mixture containing methyldichlorosilane ($CH_3HSiCl_2$), tetrachlorosilane ($SiCl_4$), and trichlorosilane ($HSiCl_3$) to fractionate a fraction with a higher content of methyldichlorosilane than the mixture before distillation in advance is performed.

According to the above-described method for producing trichlorosilane, methyldichlorosilane in trichlorosilane, which is hard to separate by distillation, is converted into a compound with a higher boiling point, thereby enabling reducing the overload on purification of high-purity trichlorosilane by distillation.

It should be noted that trichlorosilane and the like are also utilizable as the chlorine donor in the aforementioned chlorine disproportionation. Nevertheless, tetrachlorosilane is used in the present invention because tetrachlorosilane is considered to be converted into trichlorosilane after donation of chlorine, and there is no need to newly supply tetrachlorosilane from outside as it is necessarily present in a mixture produced by the trichlorosilane synthesis reaction, and so on.

Summing up the above, tetrachlorosilane is necessarily present in the product (S100A) of trichlorosilane synthesis by a reaction of metallurgical grade silicon with hydrogen chloride, the product (S100B) of the reduction reaction of tetrachlorosilane into trichlorosilane under the hydrogen-containing, or the reaction product (S100C) discharged by the production process of polycrystalline silicon using trichlorosilane as a raw material. Thus, utilization of tetrachlorosilane is advantageous in that there is no need to separately supply a chlorine donor from outside, and moreover, tetrachlorosilane is converted into trichlorosilane, a target product to be purified by distillation, after donation of chlorine, thereby also increasing the yield.

For example, according to the production process of trichlorosilane by a direct method such as ones described in Japanese Patent Laid-Open No. 2-208217 (Patent Literature 2) and Japanese Patent Laid-Open No. 9-169514 (Patent Literature 3), the main products are trichlorosilane and tetrachlorosilane, and when the conditions are optimized, trichlorosilane and tetrachlorosilane are obtained roughly at a ratio of 80:20 to 20:80.

Needless to say, it may also be possible to tentatively take out trichlorosilane after crude distillation and separately add tetrachlorosilane as the chlorine donor from outside and disproportionate chlorine with lower boiling methylchlorosilanes contained in the trichlorosilane thus taken out. In that case still, because the content of lower boiling methylchlorosilanes is normally as low as in the order of ppm, it is sufficient that the amount of tetrachlorosilane added is about 20% by mass of the fraction to be processed.

The aforementioned chlorine disproportionation reaction can also be carried out without a special catalyst, in which case there is an advantage that there is no fear of contamination of carbon impurities in the process of chlorine disproportionation reaction. However, the chlorine disproportionation reaction may also be carried out, for example, in a heated vessel with a fluidized bed of silicon containing copper chloride as a catalyst under the hydrogen-containing reducing atmosphere. For example, when about 1% of trichlorosilane containing several hundred ppm of methyldichlorosilane as an impurity, which results from the prior distillation process, is supplied to an empty tube having an electric heater or induction heating function with 99% of tetrachlorosilane as the chlorine donor and hydrogen as a carrier gas, and heat is applied, the conversion of methyldichlorosilane into methyltrichlorosilane by the chlorine disproportionation reaction is efficiently carried out.

Because a higher temperature provides a faster disproportionation speed in the chlorine disproportionation reaction, the temperature of the reaction is preferably at 300° C. or higher, more preferably at 400° C. or higher. Meanwhile, when the chlorine disproportionation reaction involves hydrogen, there may be a competition between the reduction reaction by hydrogen and the disproportionation reaction of chlorine from tetrachlorosilane at a temperature of 900° C. or higher. Therefore, the upper limit of the temperature is preferably set at 600° C.

In the chlorine disproportionation reaction, the pressure may be set within a range of, for example, 0.1 to 4.0 MPa; however, from the viewpoint of higher productivity, the reaction is preferably conducted under the highest possible pressure. Meanwhile, when the reaction is carried out under a pressure exceeding 4.0 MPa, the liquefaction phenomenon might occur in the reaction vessel. Thus, performing the reaction under a pressure exceeding 4.0 MPa is not preferable from the viewpoint of ensuring safety.

Although the reaction time depends on the presence or absence of catalyst, reaction temperature, and pressure, a certain reaction rate can be achieved with a reaction time of 10 to 30 seconds or longer. From the viewpoint of productivity of trichlorosilane, the reaction time is preferably set within a range of 30 to 200 seconds.

The conversion reaction of methyldichlorosilane into methyltrichlorosilane using tetrachlorosilane as the chlorine donor is assumed to be complicated. However, at present, the present inventors are speculating that the above reaction proceeds roughly as follows.

According to the gas chromatographic component analysis of the fraction at the inlet and outlet of the reaction vessel used for the chlorine disproportionation reaction, a reduction in the methylchlorosilane-derived $CH_3$ group and the production of $CH_4$ were observed in gas after the chlorine disproportionation reaction, and the amount of $CH_4$ produced was almost consistent with the amount of the methylchlorosilane-derived $CH_3$ group reduced. From the above results, it is highly likely that the following reactions take place in the reaction vessel.

$$SiCl_4 + H_2 \rightarrow SiHCl_3 + HCl$$

$$CH_3SiHCl_2 + HCl \rightarrow SiHCl_3 + CH_4$$

$$CH_3SiHCl_2 + SiCl_4 \rightarrow CH_3SiCl_3 + SiHCl_3$$

$$CH_3SiHCl_2 + SiHCl_3 \rightarrow CH_3SiCl_3 + SiH_2Cl_2$$

$$CH_3SiHCl_2 + H_2 \rightarrow SiH_2Cl_2 + CH_4$$

$$CH_3SiCl_3 + H_2 \rightarrow SiHCl_3 + CH_4$$

When the chlorine disproportionation reaction is incorporated into the production processes of trichlorosilane by a direct method and by reduction of tetrachlorosilane, the crude product may be directly subjected to the chlorine disproportionation process as it contains a relatively large amount of tetrachlorosilane. However, when the content of tetrachlorosilane in the crude product is low or trichlorosilane collected after concentration by distillation that contains a large amount of methyldichlorosilane (several tens to several hundred ppm) is processed, tetrachlorosilane as the chlorine donor may be separately introduced from outside.

When the chlorine disproportionation reaction is carried out batch-wise, a carrier gas need not be particularly used. However, when the chlorine disproportionation reaction is continuously performed, a carrier gas such as hydrogen and an inert gas may be used. It should be noted that when hydrogen is used as the carrier gas, hydrogen used in the production processes of trichlorosilane by a direct method and by reduction of tetrachlorosilane may be used by recirculating it.

EXAMPLES

Hereinbelow, the present invention will be specifically described with reference to Examples.

Example 1

Chlorine Disproportionation Effect

Using an empty tube reactor (reactor A) and a reactor with a fluidized bed of metallurgical grade metal silicon (reactor B), the disproportionation effect of methylchlorosilanes in a mixture of chlorosilanes was studied. As a reactor, a stainless steel tube with a diameter of 40 cm and a length of 100 cm was used.

Into the reactors, silicon tetrachloride containing 180 ppm wt methyldichlorosilane diluted with twice the molar amount of hydrogen was introduced in the gaseous state. The reactor was heated to 500° C. and the gas to be evaluated was supplied into the reactor at a superficial linear velocity of 1.0 cm/sec. Residence time in the constant temperature zone was set at about 50 seconds. The pressure in the reactor was kept at 2.0 MPa.

Methylsilanes in the product mixture supplementarily obtained from the reactors were analyzed by gas chromatography using a flame ionization detector (FID), and the amounts of methyldichlorosilane, methyltrichlorosilane, and the like were quantitated from the calibration curve prepared using a standard sample. The results thus obtained are shown in Table 1.

TABLE 1

| | Reaction temperature ° C. | $CH_3SiHCl_2$ ppmwt | $CH_3SiCl_3$ ppmwt | $SiHCl_3$ % wt |
|---|---|---|---|---|
| Raw material | — | 180 | <0.2 | ND |
| Reactor A | 200 | 180 | <0.2 | 0.1 |
| Empty | 400 | 27 | 128.6 | 0.7 |
| | 500 | 7.3 | 156.0 | 0.8 |
| Reactor B | 300 | 5.2 | 305.8 | 2.85 |

TABLE 1-continued

| | Reaction temperature °C. | $CH_3SiHCl_2$ ppmwt | $CH_3SiCl_3$ ppmwt | $SiHCl_3$ % wt |
|---|---|---|---|---|
| Filled with metallurgical grade metal silicon | 400 | 5.9 | 301.0 | 17.7 |
| | 500 | 8.2 | 163.1 | 28.4 |

From the results shown in Table 1, a reduction in methyldichlorosilane is observed within a range of 300 to 500° C. Particularly, 95% or more of methyldichlorosilane has been converted into methyltrichlorosilane after chlorine disproportionation reaction at 500° C. It is assumed that some of the methyltrichlorosilane in the reactor B is derived from the metallurgical grade metal silicon.

Example 2

Effect when Copper Chloride (CuCl) was Used as a Catalyst

Metallurgical grade metal silicon was charged with 4 wt % copper chloride (CuCl) as a catalyst and a stainless steel tube reactor (4 cm in diameter and 100 cm in length) was filled with the metallurgical grade metal silicon up to a height of 50 cm. To this reactor, silicon tetrachloride containing 180 ppm wt methyldichlorosilane was supplied with twice the molar amount of hydrogen. The conditions of chlorine disproportionation reaction were as follows: pressure, 2.0 MPa, temperature, 500° C., and retention time, 100 seconds. The ratio of trichlorosilane (TCS) to tetrachlorosilane (STC), (TCS/STC), in the final chlorosilane mixture product was roughly 3/7, and methyldichlorosilane was reduced to 7.9 ppm wt, while methyltrichlorosilane was produced in an amount of 150 ppm wt.

INDUSTRIAL APPLICABILITY

According to the method for producing trichlorosilane of the present invention, methyldichlorosilane mixed in trichlorosilane, which is hard to separate by distillation, is converted into a compound with a higher boiling point, thereby enabling reducing the burden on purification of high-purity trichlorosilane by distillation. In other words, the present invention provides a method for separating trichlorosilane from methyldichlorosilane more easily to obtain high-purity trichlorosilane.

REFERENCE SIGNS LIST

S100A, S100B, and S100C: The steps of producing a mixture containing methyldichlorosilane, tetrachlorosilane, and trichlorosilane.

S101: The step of distilling a mixture containing methyldichlorosilane, tetrachlorosilane, and trichlorosilane to fractionate a fraction with a higher content of methyldichlorosilane than the mixture before distillation.

S102: The step of converting methyldichlorosilane into methyltrichlorosilane by chlorine disproportionation.

S103: The step of purifying the fraction after disproportionation containing methyltrichlorosilane by distillation to separate high-purity trichlorosilane.

The invention claimed is:

1. A method for producing high-purity trichlorosilane from a mixture comprising methyldichlorosilane ($CH_3HSiCl_2$), tetrachlorosilane ($SiCl_4$), and trichlorosilane ($HSiCl_3$), said method comprising of:
   (A) distilling said mixture to obtain a fraction having a higher content of methyldichlorosilane than a methyldichlorosilane content of said mixture before said distilling;
   (B) heating said fraction having a higher content of methyldichlorosilane to disproportionate chlorine between methyldichlorosilane and tetrachlorosilane to convert methyldichlorosilane into methyltrichlorosilane ($CH_3SiCl_3$), to obtain a disproportionated fraction; and
   (C) distilling said disproportionated fraction to separate trichlorosilane,
   wherein either:
   (a) said heating is not performed in the presence of a catalyst;
   (b) said heating comprises heating in a heated vessel with a fluidized bed of silicon comprising copper chloride as a catalyst under a reducing atmosphere comprising hydrogen; or
   (c) said heating comprises heating to a temperature of from 400 to 600° C.

2. The method of claim 1, wherein said heating comprises heating to a temperature of from 400 to 600° C.

3. The method of claim 2, wherein said heating is not performed in the presence of a catalyst.

4. The method of claim 2, wherein said heating comprises heating in a heated vessel with a fluidized bed of silicon comprising copper chloride as a catalyst under a reducing atmosphere comprising hydrogen.

5. The method of claim 1, wherein said mixture is a product of a trichlorosilane synthesis, which comprises reacting metallurgical grade silicon with hydrogen chloride.

6. The method of claim 1, wherein said mixture is a product of a reduction reaction comprising reducing tetrachlorosilane to obtain trichlorosilane under an atmosphere comprising hydrogen.

7. The method of claim 1, wherein said mixture is obtained by a process comprising producing polycrystalline silicon with trichlorosilane as a raw material.

8. The method of claim 2, wherein said mixture is a product of a trichlorosilane synthesis, which comprises reacting metallurgical grade silicon with hydrogen chloride.

9. The method of claim 2, wherein said mixture is a product of a reduction reaction comprising reducing tetrachlorosilane to obtain trichlorosilane under an atmosphere comprising hydrogen.

10. The method of claim 2, wherein said mixture is obtained by a process comprising producing polycrystalline silicon with trichlorosilane as a raw material.

11. The method of claim 3, wherein said mixture is a product of a trichlorosilane synthesis, which comprises reacting metallurgical grade silicon with hydrogen chloride.

12. The method of claim 3, wherein said mixture is a product of a reduction reaction comprising reducing tetrachlorosilane to obtain trichlorosilane under an atmosphere comprising hydrogen.

13. The method of claim 3, wherein said mixture is obtained by a process comprising producing polycrystalline silicon with trichlorosilane as a raw material.

14. The method of claim 4, wherein said mixture is a product of a trichlorosilane synthesis, which comprises reacting metallurgical grade silicon with hydrogen chloride.

15. The method of claim 4, wherein said mixture is a product of a reduction reaction comprising reducing tetrachlorosilane to obtain trichlorosilane under an atmosphere comprising hydrogen.

16. The method of claim 4, wherein said mixture is obtained by a process comprising producing polycrystalline silicon with trichlorosilane as a raw material.

17. The method of claim 1, wherein heating comprises heating under a pressure of from 0.1 to 4.0 MPa.

* * * * *